United States Patent [19]

Ambrose, Jr. et al.

[11] 4,033,501
[45] July 5, 1977

[54] FRICTION WELDING MACHINE

[75] Inventors: Peter C. Ambrose, Jr., Manchester; Ronald F. Knapp, Coventry, both of Conn.

[73] Assignee: United Technologies Corporation, Hartford, Conn.

[22] Filed: June 9, 1976

[21] Appl. No.: 694,403

[52] U.S. Cl. .................................. 228/2; 228/113
[51] Int. Cl.² ........................................ B23K 28/00
[58] Field of Search .............. 228/2, 113; 156/73

[56] References Cited

UNITED STATES PATENTS 3,972,465  8/1976  Takaoka et al. .................. 228/2

Primary Examiner—Al Lawrence Smith
Assistant Examiner—Robert C. Watson
Attorney, Agent, or Firm—Edward J. Timmer

[57] ABSTRACT

A friction welding machine having a unitized headstock and tailstock assembly is disclosed. The unitized assembly includes a rigid tailstock housing in which a headstock flywheel is rotatably and slidably disposed. The unitized assembly prevents radial movement of the headstock and tailstock with respect to one another and thereby maintains predetermined workpiece alignment throughout the welding process.

11 Claims, 1 Drawing Figure

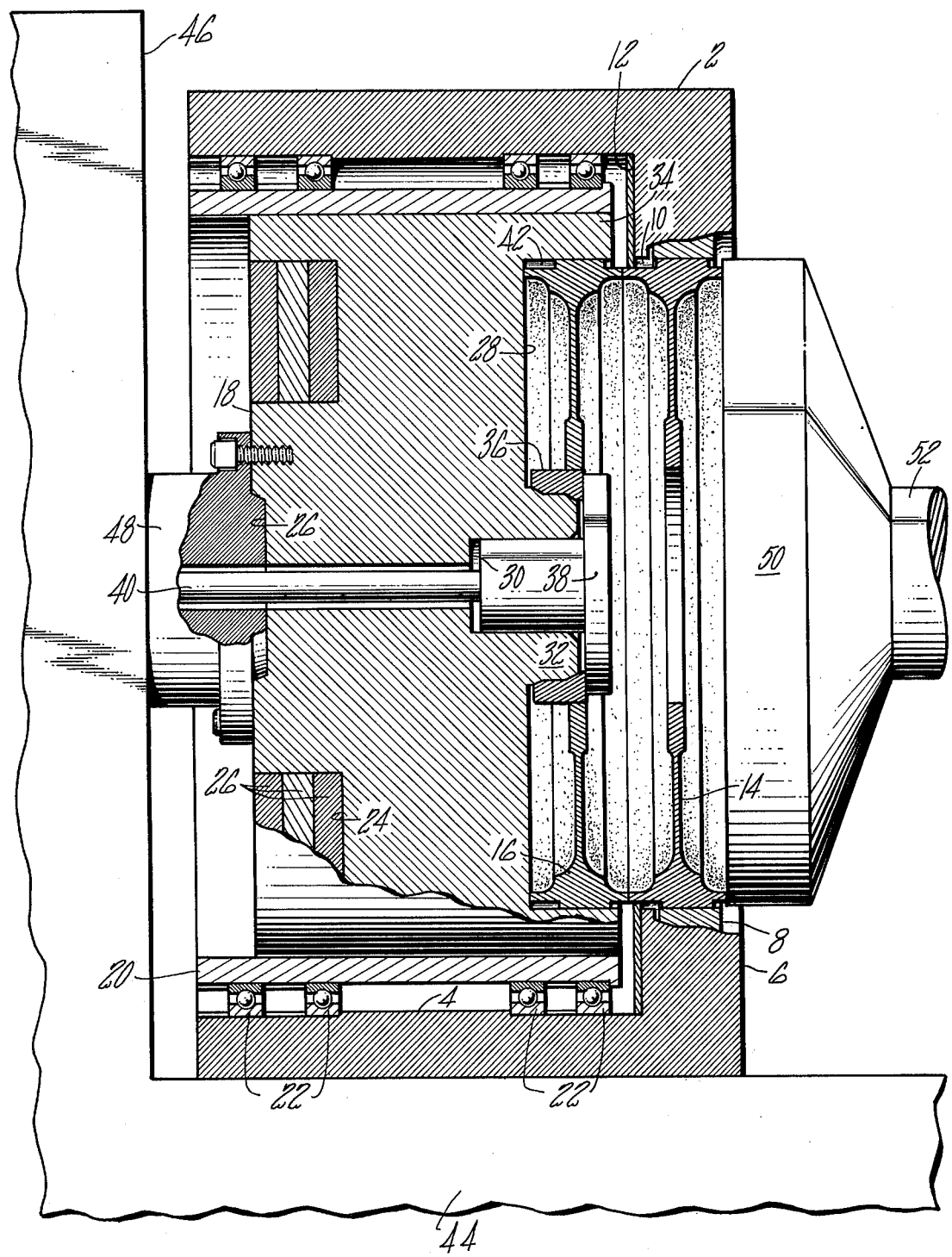

FRICTION WELDING MACHINE

BACKGROUND OF THE INVENTION

1. Field of the Invention

The present invention relates to friction welding machines.

2. Description of the Prior Art

Friction welding is generally defined as a solid state bonding process in which one metal workpiece is rotated at relatively high controlled speed against a stationary workpiece. The workpiece surfaces are heated by frictional contact to high temperatures and forged together to produce the bond, the bond being completed within seconds after frictional contact is made. Friction welding is advantageous not only because of the short bonding cycle but also because only a narrow heat affected zone is produced in the base metal adjacent the weld.

A type of friction welding known as inertia bonding is widely used to join metal workpieces together. In a typical inertia bonding device, such as that illustrated in U.S. Pat. No. 3,273,233, the workpiece to be rotated is fixtured in a headstock assembly while the nonrotating workpiece is fixtured in a tailstock assembly, each assembly being separately bolted or otherwise secured to the bed of a suitable machine. The headstock assembly generally includes a spindle having a chuck at one end and an inertial mass, such as a flywheel, in proximity thereto. At the other end is located a drive mechanism or other means for rotating the spindle. The tailstock assembly is somewhat simpler and includes a slidable spindle keyed against rotation, the spindle having a chuck at one end. The headstock and tailstock spindles are mounted on separate bearing surfaces to position the chucks in opposed relation so that the workpieces are held in predetermined alignment. However, shimming is often required to obtain the desired workpiece alignment, especially if close concentricity tolerances are called for.

In operation, a suitable motor rotates the headstock spindle to a predetermined angular velocity, the motor is disengaged and the tailstock spindle is advanced toward the headstock assembly to engage the nonrotating workpiece with the rotating workpiece. Sufficient axial pressure is exerted across the interface to bring the workpiece surfaces to the bonding temperature. During frictional engagement, three stages in the bonding process are disconcernible. In the first, localized seizure and rupture of the seized areas occurs at the interface, as evidenced by a rise in the measured torque. The angular velocity of the flywheel decreases as a result of the conversion of kinetic energy to heat at the interface. At the beginning of the second stage, the temperature and pressure needed for bonding are present at the interface but the flywheel velocity is still above the critical value at which bonding can occur. As the flywheel velocity decreases further and approaches the critical value, there is a transition from the second to the third stage during which the measured torque rapidly increases to an extremely high value, indicating that a bond has formed across the interface. In the third stage, after bond formation, extensive plastic working of the bond occurs as a result of the extremely high torque present. Plastic working of the bond quickly dissipates the remaining kinetic energy of the flywheel and it finally comes to rest, the bonding process being completed.

As mentioned, in the prior art bonding devices, the headstock and tailstock assemblies are separately secured to the machine bed. Although these assemblies may be quite massive and be very securely mounted to the machine, the torque developed during and after bond formation is so high that relative radial movement of the assemblies is oftentimes observed. Torques greater than 100,000 pound-feet are common and have been observed to plastically strain the bolts holding the assemblies to the machine. Of course, the amount of torque developed will depend on the size of the workpieces being bonded, larger pieces generating higher torque. Radial movement between the headstock and tailstock assemblies is manifested by misalignment, such as a loss of concentricity, between the joined workpieces which necessitates further corrective machining operations or, in some instances, complete rejection of the bonded part.

Misalignment between the bonded workpieces is further aggravated by the prior art practice of fixturing the workpieces in chucks at the ends of the headstock and tailstock spindles in cantilever fashion. In this arrangement, no means are immediately adjacent the bond interface for supporting the chucks against the extremely high torque generated there.

SUMMARY OF THE INVENTION

It is an object of the present invention to provide an improved friction welding machine in which predetermined alignment between the workpieces to be joined is maintained throughout the entire bonding process.

It is another object of this invention to prevent misalignment between the joined workpieces as a result of radial movement of the headstock and tailstock assemblies during high torque stages of the bonding process.

It is still another object of the invention to minimize misalignment between the joined workpieces as a result of fixturing the workpieces in cantilever fashion.

The present invention contemplates a friction welding machine having a unitized headstock and tailstock assembly which precludes radial movement of the headstock and tailstock with respect to one another and which provides supported workpiece fixturing means closely adjacent the bond interface. In a typical embodiment of the invention, the unitized assembly includes a rigid tailstock housing having an internal wall which defines a cylindrical bore extending longitudinally therethrough. Tailstock workpiece fixturing means are mounted against and supported by the internal wall at one end of the bore. Also disposed in the bore is a cylindrical headstock flywheel which is mounted for rotational and sliding movement therein. Headstock workpiece fixturing means are rigidly supported in the end of the flywheel facing the tailstock fixturing means, the headstock and tailstock fixturing means being adapted to hold the workpieces to be joined in predetermined alignment. In one mode of operation, the tailstock housing is securely mounted to the bed of a machine having drive means at one end and back-up means at the other end. The drive means imparts a selected rotational velocity to the flywheel and workpiece fixtured thereon and then advances the flywheel through the bore to effect frictional engagement between the rotating workpiece and the stationary workpiece held in the tailstock fixturing means. During and after bond formation when extremely high torque is developed, the unitized headstock and tailstock are incapable of radial movement with respect to one another, since they are a unit and move as a unit. If the torque created at the bond interface is high enough to shift the headstock flywheel off center, the tailstock housing and stationary workpiece fixtured thereto will simultaneously shift with the flywheel and maintain the predetermined workpiece alignment. Workpiece alignment is automatically maintained even if the tailstock housing or a portion thereof is temporarily lifted from the machine bed.

Another particular advantage of the unitized headstock and tailstock assembly is that misalignment of the joined workpieces as a result of cantilever fixturing is drastically reduced, if not eliminated. Since the headstock flywheel is slidable within the bore of the tailstock housing, the fixturing means supported thereon can be brought in very close proximity to the tailstock fixturing means. This feature provides supported workpiece fixturing means closely adjacent the bond interface where support against high torque is greatly needed.

The friction welding machine of the present invention is especially useful in production processes wherein workpieces of circular cross section, such as shafts, rings and the like, are to be joined to very close concentricity tolerances.

Other objects and advantages of the present invention will become apparent from the following drawing and detailed description of the preferred embodiment.

BRIEF DESCRIPTION OF THE DRAWING

The FIGURE is a vertical sectional view through a friction welding machine having a unitized headstock and tailstock assembly.

DESCRIPTION OF THE PREFERRED EMBODIMENT

Although the present invention is described in detail hereinbelow with reference to inertia bonding, it is not so limited. The invention has general applicability in the field of friction welding and may be utilized to produce numerous types of joints between workpieces, including, but not limited to, the common types such as bar-to-bar, bar-to-tube, tube-to-tube, bar-to-plate, tube-to-plate and angular joints. The present invention is especially useful in joining workpieces of circular cross section to close concentricity tolerances.

Referring to the FIGURE, a unitized headstock and tailstock assembly useful in joining annular workpiece sections having the same inner and outer diameters to form a hollow gas turbine drum rotor is illustrated. The unitized assembly is shown as comprising a rigid tailstock housing 2 having internal wall 4 which defines a cylindrical bore extending longitudinally therethrough. Tailstock workpiece fixturing means are securely mounted against the internal wall and include annular support rib 6 projecting from the wall, collet chuck 8 supported on the rib and a plurality of torque keys 10. Annular support rib 6 may be an independent member securely fastened to the wall or, preferably, is an integral part of the tailstock housing. Rib 6 is suitably machined or the like so that the inner circumferential surface has a stepped or two angle contour and is concentric with the bore of the housing. The stepped surface provides location and support means for collet chuck 8 which is adapted to grip and hold the annular workpiece around its outer circumference. As illustrated, collet chuck 8 is designed to contract around the outer workpiece circumference when the chuck is moved across the stepped surface toward the headstock flywheel. The inner and outer diameter of collet chuck 8 are selected to suit the particular workpiece being held. Torque keys 10 are also supported and positioned on annular rib 6 and are adapted to engage the annular workpiece to prevent its rotation during bonding. If desired, the torque keys may be adjustable to accommodate annular workpieces of differing outer diameters. Both the collet chuck and torque keys are preferably actuated by hydraulic means, not shown, in the conventional manner. If desired, squareness plates 12 may be inserted adjacent the rib, as shown, to insure proper orientation of the workpiece surface to be bonded; i.e. proper orientation of the bonding plane. The function of the tailstock fixturing means is to hold the nonrotating annular workpiece 14 in concentric alignment with the rotating annular workpiece 16, as described more fully hereinbelow. Of course, those skilled in the art will recognize that other types and configurations of tailstock workpiece fixturing means may be utilized in the present invention.

Disposed for rotational and sliding motion in the bore of the tailstock housing is a cylindrical headstock flywheel 18. To facilitate dual motion of the flywheel, the flywheel is rotatably and slidably mounted in sleeve 20 which, in turn, is rotatably but no slidably mounted on bearings 22. As discussed below, the flywheel, when rotated, provides the kinetic energy necessary to heat the frictionally engaged workpiece surfaces to the bonding temperature. The amount of inertial mass required will depend upon the size of the workpieces and upon the type of joint to be produced. To this end, the flywheel has annular slot 24 in the end facing opposite the tailstock fixturing means to accept annular weights 26. Of course, slot 24 should be concentric with the axis of rotation of the flywheel to insure smooth operation thereof. Incorporated on the same end is coupling 26 adapted to receive the machine spindle which rotates and slides the flywheel in the bore of the tailstock housing.

As illustrated in the FIGURE, the end of the flywheel facing the tailstock fixturing means has annular slot 28 and counter bore 30 machined therein, the slot and counter bore being concentric with the axis of rotation of the flywheel. The slot defines hub 32 and annular support rib 34 between which the other annular workpiece is fixtured. Collet chuck 36 is disposed on the stepped surface of hub 32 and is adpated to expand and contract upon being moved thereacross. Movement of the collet chuck is effected by drawn bar head 38 which is disposed in counter bore 30 and is connected to draw bar 40 extending centrally through the flywheel and machine spindle, the draw bar being actuated by hydraulic means, not shown, connected to the machine. To fixture the annular workpiece in the end of the flywheel, the workpiece is inserted between the opposed surfaces of the hub and annular rib and the draw bar head is pulled into the counter bore by the draw bar. The draw bar head moves the collet chuck across the stepped surface in the direction of the flywheel and expands the chuck against the workpiece thereby fixturing it as shown. Collet chucks of various outer diameters are utilized to hold workpieces of various inner diameters. Rotation of workpiece 16 relative to the flywheel is prevented by a plurality of torque keys 42 disposed on the inner circumferential surface of annular rib 34. Of course, those skilled in the art will recognize that other types and configurations of headstock fixturing means may be utilized in the present invention.

Those skilled in the art will also recognize that achievement of concentric alignment between annular workpieces or, more generally, workpieces of circular cross section, is readily effected in the preferred headstock and tailstock assembly discussed hereinabove since concentricity among the components, including the headstock and tailstock fixturing means, is built into the assembly. By proper selection of collet chuck size, such workpieces, including those having different diameters, may be concentrically aligned to close tolerances with no further set-up adjustments, such as shimming and the like.

In typical production service, tailstock housing 2 is secured to bed 44 of machine 46 by suitable means, not shown, such as bolts. At one end of the machine is spindle 48 suitably connected to a drive motor, not shown. As shown in the FIGURE, the spindle is coaxially aligned with the flywheel and has a centrally located bore therein to accommodate the draw bar. Spindle 48 is adapted for insertion into the end of the bore and for engagement with the coupling on the end of the flywheel. At the other end of the machine is a back-up bar 50 positioned in contact with the nonrotating workpiece, as shown, to support it against the thrust of the flywheel. The back-up bar is, in turn, supported by shaft 52 which is attached to the bed of the machine. Preferably, the back-up bar is movable to accommodate the increasing size of the nonrotating workpiece as the annular workpiece sections are joined together. For example, in forming the gas turbine drum rotor, five or more annular sections may be joined together to form the rotor. As the sections are joined one at a time, the nonrotating workpiece will increase in length. The provision of a movable back-up bar will allow this increased length to be accommodated with no repositioning or adjustments to the headstock and tailstock components.

In operation, machine spindle 48 first rotates the flywheel and workpiece fixtured thereon to a preselected angular velocity. Rotation of the spindle is then terminated and the spindle is extended laterally to slide the rotating flywheel through the simultaneously rotating sleeve toward the nonrotating workpiece to effect frictional workpiece engagement at the bonding interface. The spindle exerts sufficient axial pressure across the interface to bring the workpiece surfaces to the elevated temperature needed for bonding. When ultra high torque is generated during and after bond formation, the concentric workpiece alignment is maintained by the supported workpiece fixturing means closely adjacent the bond interface, as shown, and by the unitized headstock and tailstock which are incapable of radial movement with respect to one another. Radial movement of the headstock and tailstock is precluded because they are a unit and move as a unit. If high torque at the bond interface tends to force the headstock flywheel off center, the tailstock housing and workpiece fixtured thereto simultaneously shift with it to maintain concentric workpiece alignment. Even if the housing is temporarily lifted from the machine bed, workpiece alignment will be maintained as a result of the unitized construction of the headstock and tailstock assembly. With the apparatus discussed herein, concentricity tolerances between workpieces of circular cross section can be maintained within ±.002 inch throughout the entire bonding process. Thus, the present invention represents a significant step forward in the art of friction welding.

Although the apparatus of the invention has been illustrated as operating with the headstock flywheel rotating and sliding in the stationary tailstock housing, those skilled in the art will recognize that other modes of operation are possible. For example, another mode of operation would involve rotating the headstock flywheel while sliding the tailstock housing to effect frictional engagement of the workpiece surfaces. So long as relative rotational and sliding motion is imparted between the flywheel and housing to effect frictional workpiece engagement, the objects of the present invention may be achieved. Those skilled in the art will also recognize that other changes, omissions and additions in the form and detail of the illustrated embodiment may be made without departing from the spirit and scope of the invention.

Having thus described a typical embodiment of our invention, that which we claim as new and desire to secure by Letters Patent of the United States is:

1. In a friction welding machine for bonding workpieces together, the improvement comprising a unitized headstock and tailstock assembly including:
   a. a rigid tailstock housing having an internal wall which defines a cylindrical bore extending therethrough, tailstock workpiece fixturing means being integrally connected to and rigidly supported against said wall;
   b. a cylindrical headstock flywheel rotatably and slidably supported in the bore against the internal wall of the tailstock housing, headstock workpiece fixturing means being securely supported by the end of the flywheel facing the tailstock workpiece fixturing means, said headstock and tailstock fixturing means establishing predetermined workpiece alignment,
   said flywheel and housing having sufficient rotational and sliding motion imparted therebetween to effect frictional workpiece engagement at a common interface, said predetermined workpiece alignment being maintained throughout such engagement by the supported workpiece fixturing means adjacent the interface and by the unitized headstock and tailstock which are incapable of radial movement with respect to one another.

2. The assembly of claim 1 wherein the headstock and tailstock fixturing means are adapted for holding workpieces of circular cross section in concentric alignment.

3. The assembly of claim 2 wherein said fixturing means are adapted for holding annular workpieces in concentric alignment.

4. The assembly of claim 3 wherein the tailstock fixturing means includes an annular support rib at one end of said bore, the rib being an integral part of the tailstock housing, said rib having an inner circumferential surface concentric with said bore, said surface supporting a collet chuck and a plurality of torque keys thereon, the collet chuck being adapted for gripping the outer workpiece circumference and the torque keys projecting radially inward for preventing workpiece rotation.

5. The assembly of claim 3 wherein the headstock fixturing means includes a central hub and annular support rib concentrically disposed on said end of the flywheel, the hub and rib defining an annular slot for workpiece insertion therein, said hub having disposed therearound a collet chuck adapted for expanding radially outward against the inner workpiece circumference, thereby effecting workpiece fixturing in said slot, said rib having a plurality of torque keys projecting radially therefrom toward the hub for preventing workpiece rotation relative to the flywheel.

6. The assembly of claim 1 wherein the flywheel includes means for varying the inertial mass thereof.

7. An inertia bonding machine for joining workpieces of circular cross section together, comprising:
 a. a rigid tailstock housing having an internal wall which defines a cylindrical bore extending therethrough, tailstock workpiece fixturing means being integrally connected to and rigidly supported against said wall at one end of the bore;
 b. a cylindrical headstock flywheel rotatably and slidably supported in the bore against the internal wall of the tailstock housing, headstock workpiece fixturing means being securely supported by the end of the flywheel facing the workpiece fixturing means, said headstock and tailstock fixturing means establishing concentric workpiece alignment;
 c. a base on which the tailstock housing is securely mounted, including means for imparting sufficient rotational and sliding motion to the flywheel to effect frictional workpiece engagement at a common interface and back-up means for providing tailstock workpiece support against the thrust of the sliding flywheel, said concentric workpiece alignment being maintained throughout workpiece engagement by the supported workpiece fixturing means adjacent the interface and by the unitized headstock and tailstock which are incapable of radial movement with respect to one another.

8. The machine of claim 7 wherein said fixturing means are adapted for holding annular workpieces in concentric alignment.

9. The machine of claim 8 wherein the tailstock fixturing means includes an annular support rib at one of said bore, the rib being an integral part of the tailstock housing, said rib having an inner circumferential surface concentric with said bore, said surface supporting a collet chuck and a plurality of torque keys thereon, the collet chuck being adapted for gripping the outer workpiece circumference and the torque keys projecting radially inward for preventing workpiece rotation.

10. The machine of claim 8 wherein the headstock fixturing means includes a central hub and annular support rib concentrically disposed on said end of the flywheel, the hub and rib defining an annular slot for workpiece insertion therein, said hub having disposed therearound a collet chuck adapted for expanding radially outward against the inner workpiece circumference, thereby effecting workpiece fixturing in said slot, said rib having a plurality of torque keys projecting radially therefrom toward the hub for preventing workpiece rotation relative to the flywheel.

11. The machine of claim 7 wherein the flywheel includes means for varying the inertial mass thereof.

* * * * *